United States Patent
Oikawa

(10) Patent No.: US 10,642,557 B2
(45) Date of Patent: May 5, 2020

(54) DATA COMMUNICATION AND TRANSMISSION FOR INFORMATION PROCESSING DEVICES IN A NETWORK

(71) Applicant: Konica Minolta, Inc., Chiyoda-ku, Tokyo (JP)

(72) Inventor: Takashi Oikawa, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/991,555

(22) Filed: May 29, 2018

(65) Prior Publication Data

US 2018/0349080 A1    Dec. 6, 2018

(30) Foreign Application Priority Data

Jun. 1, 2017    (JP) ................... 2017-108983

(51) Int. Cl.
  *G06F 3/12*    (2006.01)
  *G06F 9/50*    (2006.01)
  *H04N 1/00*    (2006.01)

(52) U.S. Cl.
  CPC .......... *G06F 3/1273* (2013.01); *G06F 3/1203* (2013.01); *G06F 3/1226* (2013.01); *G06F 3/1232* (2013.01); *G06F 3/1291* (2013.01); *G06F 9/5083* (2013.01); *G06F 3/1286* (2013.01); *H04N 1/00228* (2013.01);
  (Continued)

(58) Field of Classification Search
  USPC ....................................................... 358/1.15
  See application file for complete search history.

(56) References Cited

U.S. PATENT DOCUMENTS

| 2002/0138557 A1* | 9/2002 | Mukaiyama | G06F 3/1204 709/203 |
| 2015/0103376 A1* | 4/2015 | Saeda | G06F 3/1253 358/1.15 |

(Continued)

FOREIGN PATENT DOCUMENTS

| JP | 2007306138 | 9/2006 |
| JP | 2011164862 | 8/2010 |
| JP | 2014-000785 | 1/2014 |

OTHER PUBLICATIONS

First Office Action issued in corresponding CN Application No. 201810518541.1, dated Aug. 16, 2019.

*Primary Examiner* — Allen H Nguyen
(74) *Attorney, Agent, or Firm* — BakerHostetler

(57) ABSTRACT

An information processing device is provided together with other information processing devices in a network and is capable of communicating with a server, and includes: a data communicator that transmits a predetermined kind of information about the respective other information processing devices to the server when the information processing device is in a first mode, and transmits the predetermined kind of information about the information processing device to a device functioning in the first mode when the information processing device is in a second mode; an acquisitor that acquires load information; a determiner that determines a smallest load device; a mode setter that performs a mode setting process to realize a state where in the device determined to be the smallest load device is in the first mode, and the other devices are in the second mode; and a mode notifier that notifies the other information processing devices of the state.

19 Claims, 14 Drawing Sheets

(52) U.S. Cl.
CPC ............... *H04N 2201/0032* (2013.01); *H04N 2201/0094* (2013.01)

(56) References Cited

U.S. PATENT DOCUMENTS

| | | | |
|---|---|---|---|
| 2016/0283167 A1* | 9/2016 | Yeung | G06Q 10/087 |
| 2016/0323197 A1* | 11/2016 | Guzman | H04L 47/726 |
| 2018/0239571 A1* | 8/2018 | Kodimer | G06F 3/1203 |

* cited by examiner

| IDENTIFIER | CURRENT MODE | NEXT MODE |
|---|---|---|
| 001 | | MASTER |
| 002 | | SLAVE |
| 003 | | SLAVE |

| IDENTIFIER | CURRENT MODE | NEXT MODE |
|---|---|---|
| 001 | MASTER | |
| 002 | SLAVE | |
| 003 | SLAVE | |

| IDENTIFIER | CURRENT MODE | NEXT MODE |
|---|---|---|
| 001 | MASTER | SLAVE |
| 002 | SLAVE | MASTER |
| 003 | SLAVE | SLAVE |

| PRINT PAGE NUMBER Fa | LOAD VALUE Ra |
|---|---|
| 1 TO 10 PAGES | Ra1 |
| 11 TO 30 PAGES | Ra2 |
| 31 TO 50 PAGES | Ra3 |
| 51 PAGES OR MORE | Ra4 |
| RESOLUTION Fb | LOAD VALUE Rb |
| 300 dpi | Rb1 |
| 600 dpi | Rb2 |
| 1200 dpi | Rb3 |
| DATA SIZE Fc | LOAD VALUE Rc |
| LESS THAN 1 MB | Rc1 |
| 1 MB OR MORE AND LESS THAN 10 MB | Rc2 |
| 10 MB OR MORE | Rc3 |
| IMAGE TYPE Fd | LOAD VALUE Rd |
| CHARACTERS ONLY | Rd1 |
| FIGURE(S) INCLUDED | Rd2 |
| PICTURE(S) INCLUDED | Rd3 |

| TRANSMISSION PAGE NUMBER Ga | LOAD VALUE Sa |
|---|---|
| 1 TO 10 PAGES | Sa1 |
| 11 TO 30 PAGES | Sa2 |
| 31 TO 50 PAGES | Sa3 |
| 51 PAGES OR MORE | Sa4 |
| RESOLUTION Gb | LOAD VALUE Sb |
| 300 dpi | Sb1 |
| 600 dpi | Sb2 |
| 1200 dpi | Sb3 |
| FILE FORMAT Gc | LOAD VALUE Sc |
| COMPACT PDF | Sc1 |
| JPEG | Sc2 |
| PDF | Sc3 |
| OCR COMPATIBILITY Gd | LOAD VALUE Sd |
| NOT COMPATIBLE | Sd1 |
| COMPATIBLE | Sd2 |

| DOCUMENT NUMBER Ha | LOAD VALUE Ua |
|---|---|
| 1 TO 10 PAGES | Ua1 |
| 11 TO 30 PAGES | Ua2 |
| 31 TO 50 PAGES | Ua3 |
| 51 PAGES OR MORE | Ua4 |
| IMAGE SYNTHESIS SUITABILITY Hb | LOAD VALUE Ub |
| NOT SUITABLE | Ub1 |
| SUITABLE | Ub2 |
| BOOKLET SUITABILITY Hc | LOAD VALUE Uc |
| NOT SUITABLE | Uc1 |
| SUITABLE | Uc2 |
| COLOR CONVERSION SUITABILITY Hd | LOAD VALUE Ud |
| NOT SUITABLE | Ud1 |
| SUITABLE | Ud2 |

DATA COMMUNICATION AND TRANSMISSION FOR INFORMATION PROCESSING DEVICES IN A NETWORK

This application claims priority to Japanese Patent Application No. 2017-108983, filed on Jun. 1, 2017, the entire disclosure of which is hereby incorporated by reference.

BACKGROUND

Technological Field

The present invention relates to a technology for collectively transmitting data of devices provided in a network to a server or the like.

Description of the Related Art

Image forming devices called multifunction peripherals (MFP) have become common. Image forming devices are installed in a network, and, in such a network, an image forming device transmits data to the other image forming devices or receives data from the other image forming devices. Further, via the Internet, an image forming device transmits data to a device outside the network or receives data from an external device.

JP 2007-306138 A and JP 2011-164862 A disclose such technologies for an image forming device to exchange data with a device in the same network or a device outside the network.

In a document delivery system disclosed in JP 2007-306138 A, the CPU load is determined, and jobs are appropriately distributed. An MFP is provided in a network, and document delivery devices are also provided in the network. In accordance with user operations, the MFP performs scanning, copying, printing, and facsimile transmission. In an operation of a document delivery device, digitized documents (jobs) sent from an input device are received, and the jobs are distributed in accordance with the load on the CPU of the cooperating server. The distributed jobs are then executed.

In a management system disclosed in JP 2011-164862 A, when a transmission destination of operation information about an image forming device is set in a monitoring device, the image forming device is put into a transmission mode in which operation information is collected in response to a request from the monitoring device, or a transmission mode in which the operation information is collected by the image forming device voluntarily performing transmission, in accordance with the type of the operation information to be collected.

When an image forming device transmits data to a server outside the network, a transmission delay is not preferable in some cases.

For example, in a case where a user who has used a service of an image forming device is charged, a delay in transmission of the charging data for charging the user to an external charging server might affect the operation of collecting fees. Further, in a case where the image forming device breaks down, a delay in transmission of failure data indicating a failure of the image forming device to an external maintenance server might delay the response to the failure.

Particularly, in a case where there are image forming devices in one network, and one of the image forming devices collectively transmits the information about all the image forming to devices to an external server, the transmission is sometimes delayed.

The inventions disclosed in JP 2007-306138 A and JP 2011-164862 A do not concern an image forming device that collectively transmits data to an external device, and therefore, cannot solve the above problem.

SUMMARY

In view of the above problem, an object of the present invention is to provide an information processing device such as an image forming device that collectively transmits its own data and data of other information processing devices with a shorter delay than that in a conventional case.

To achieve the abovementioned object, according to an aspect of the present invention, there is provided an information processing device, reflecting one aspect of the present invention, that is provided together with a plurality of other information processing devices in a network and is capable of communicating with a server, the information processing device comprising: a data communicator that transmits a predetermined kind of information about the respective other information processing devices to the server when the information processing device is in a first mode, and transmits the predetermined kind of information about the information processing device to a device functioning in the first mode among the other information processing devices when the information processing device is in a second mode; an acquisitor that acquires load information about a load of each of the other information processing devices; a determiner that determines a smallest load device that is the device having the smallest load among the other information processing devices and the information processing device, in accordance with the acquired load information and the load information about the information processing device; a mode setter that performs a mode setting process to realize a state where the device determined to be the smallest load device is in the first mode, and the other devices are in the second mode, among the other information processing devices and the information processing device; and a mode notifier that notifies the other information processing devices of the state.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 6A through 6C are tables showing examples of mode data;

FIGS. 9A through 9C show examples of attribute-load relation tables;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
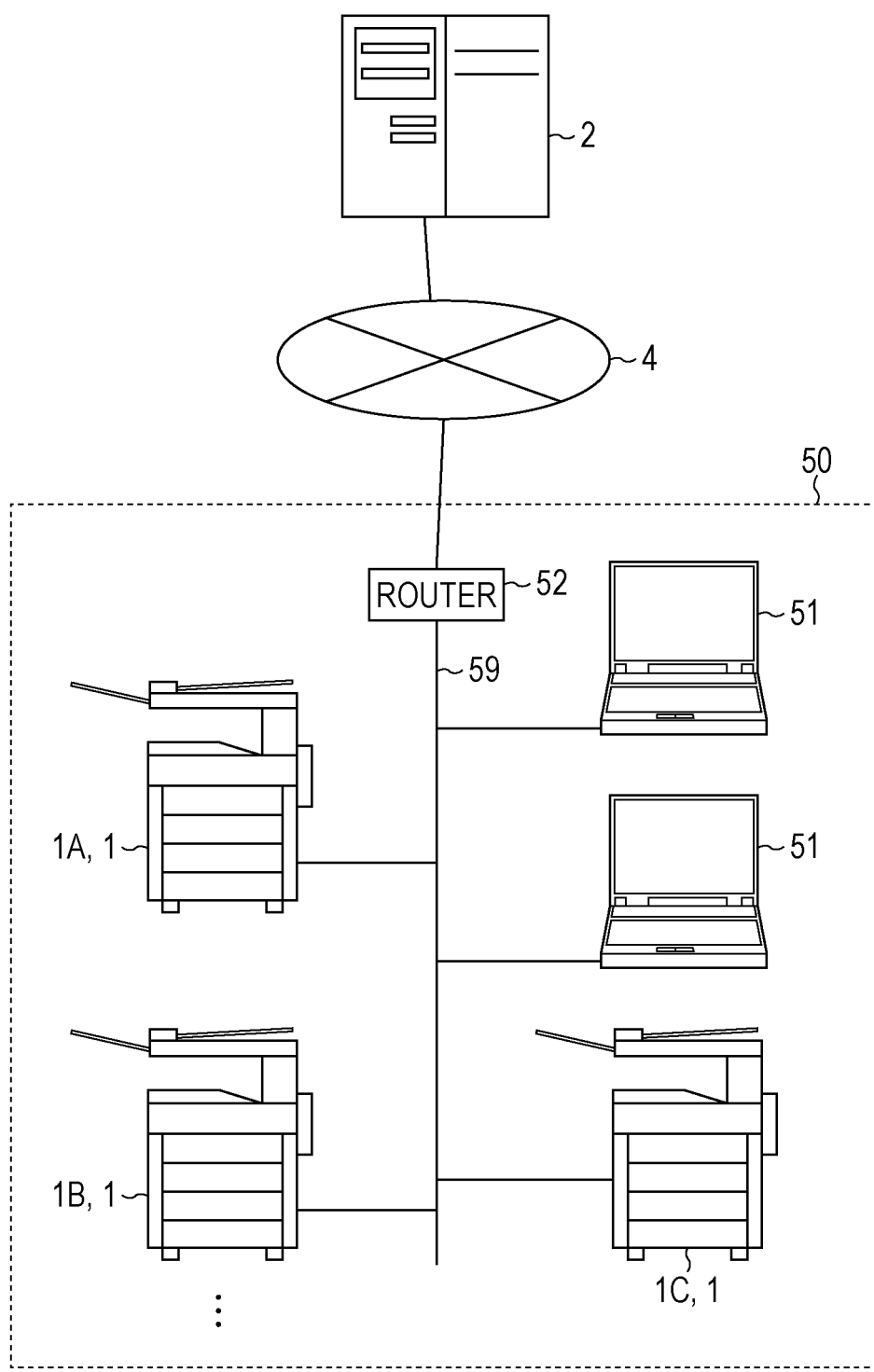
FIG. 1 is a diagram showing an example overall configuration of a data aggregation system.
Figure 2:
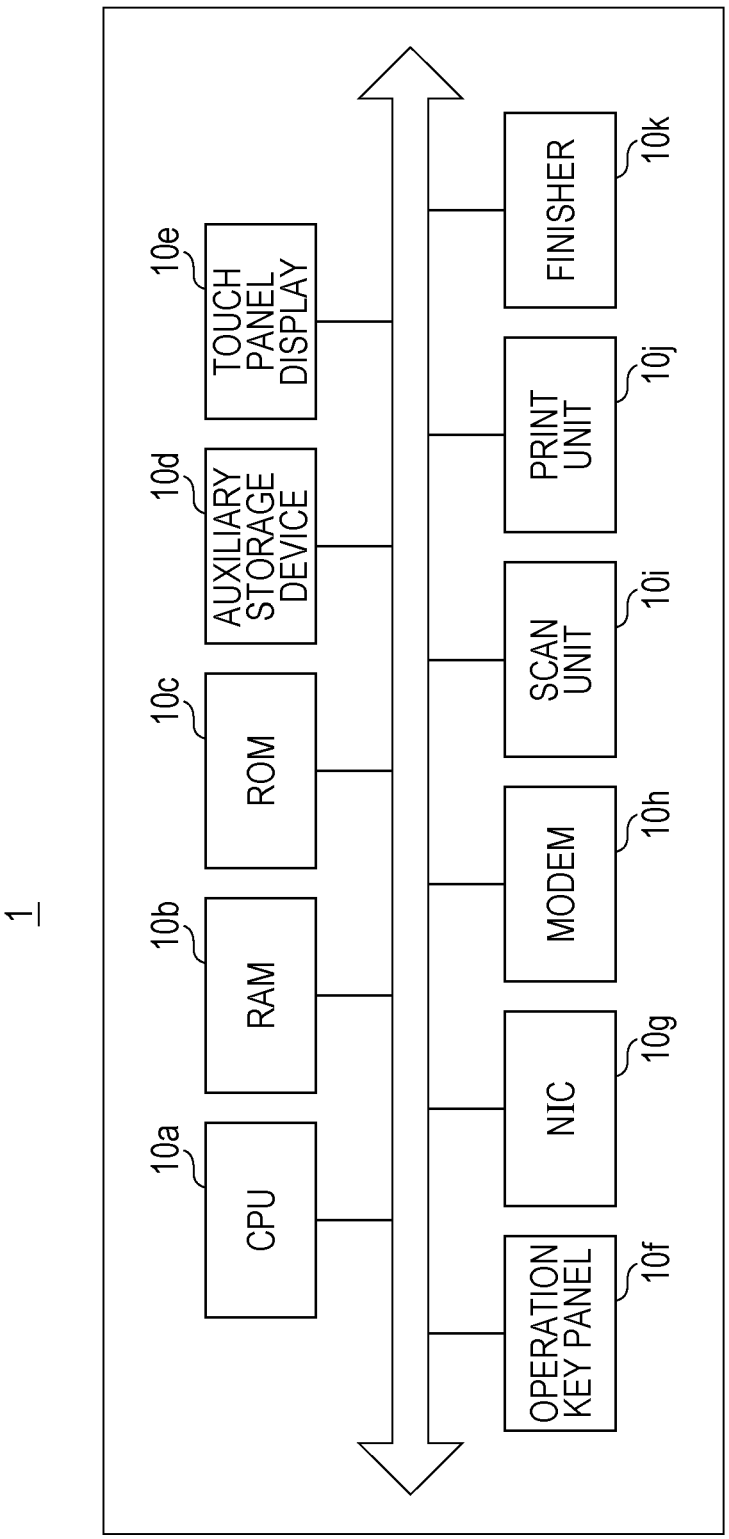
FIG. 2 is a diagram showing an example hardware configuration of an image processing device.

FIG. 1 is a diagram showing an example overall configuration of a data aggregation system 100. FIG. 2 is a diagram showing an example hardware configuration of an image processing device 1.

As shown in FIG. 1, the data aggregation system 100 includes a server 2, a communication line 4, and a local area network (LAN) 50.

The data aggregation system 100 is a system that acquires data through image processing devices 1, and collectively manages the data in the server 2.

The LAN 50 includes the image processing devices 1, terminal devices 51, a router 52, and a communication line 59. The terminal devices 51 may be personal computers, tablet computers, smartphones, or the like.

The respective image processing devices 1, the respective terminal devices 51, and the router 52 can communicate with one another via the communication line 59. The communication line 59 is formed with a hub, a twisted pair cable, or the like. In a case where a so-called wireless LAN is used, a wireless base station is further provided for the communication line 59.

The router 52 connects the LAN 50 to another network. A device (an image processing device 1 or a terminal device 51) in the LAN 50 is connected to the server 2 by the router 52.

An image processing device 1 and the server 2 can communicate with each other via the communication line 4. The communication line 4 may be the Internet, a dedicated line, a public line, or the like.

In the description below, the image processing devices 1 will be sometimes referred to as the "image processing device 1A", the "image processing device 1B", the "image processing device 1C", and the like.

In each of these image processing devices 1, the two communication modes of "master mode" and "slave mode" are prepared, and one of them is selectively set.

The "master mode" is a mode in which the image processing device 1 receives data from another image processing device 1, and uploads the data together with its own data to the server 2. The "slave mode" is a mode in which the image processing device 1 transmits its own data to another image processing device 1 whose communication mode is the master mode.

In the description below, an image processing device 1 in the master mode will be sometimes referred to as a "master MFP", and an image processing device 1 in the slave mode will be sometimes referred to as a "slave MFP".

Only one image processing device 1 functions as a master MFP in one period (one day, for example), and the other image processing devices 1 function as slave MFPs. Therefore, one image processing device 1 collectively transmits its own data and the data of all the other image processing devices 1 to the server 2. The communication mode is appropriately changed each time the period changes. For example, in a case where the period is one day (24 hours from 0 am to 12 pm on the same day), the communication mode is changed as appropriate every time the date changes.

The following is a description of an example case where device data 6A is handled as such data. The device data 6A is data that includes information about hardware modules or expendable items, such as the amount of space in an auxiliary storage device 10d (see FIG. 2), the remaining number of paper sheets, the remaining amount of toner, and the cumulative number of printed sheets in a print unit 10j, and the remaining number of staples in a stapler in a finisher 10k.

An image processing device 1 is a device that collectively has functions such as a copy function, a PC print function, a facsimile function, a scanner function, and a box function. Such a device is generally called "multifunction peripherals (MFP)" or the like in some cases.

The PC print function is a function of printing an image on a paper sheet in accordance with image data received from the terminal device 51. This function is also called "network printing" or "network print" in some cases.

The box function is a function for allocating a storage area called a "box" or a "personal box" to each user, and allowing each user to store and manage image data and the like in his/her own storage area. Alternatively, a box may be prepared for each group so that the members of the same group can share the box. The box corresponds to a "folder" or a "directory" in a personal computer.

As shown in FIG. 2, an image processing device 1 includes a central processing unit (CPU) 10a, a random access memory (RAM) 10b, a read only memory (ROM) 10c, an auxiliary storage device 10d, a touch panel display 10e, an operation key panel 10f, a network interface card (NIC) 10g, a modem 10h, a scan unit 10i, a print unit 10j, and a finisher 10k.

The touch panel display 10e displays a screen showing a message to the user, a screen for the user to input a command or information, a screen showing the results of processing performed by the CPU 10a, and the like. The touch panel display 10e also sends a signal indicating a touched position to the CPU 10a.

The operation key panel 10f is a so-called hardware keyboard, and is formed with a ten-key pad, a start key, a stop key, function keys, and the like.

The NIC 10g communicates with another device with a protocol such as Transmission Control Protocol/Internet Protocol (TCP/IP).

The modem 10h exchanges image data with a facsimile terminal with a protocol such as G3.

The scan unit 10i reads an image drawn/written on a sheet set on the platen glass, and then generates image data.

The print unit 10j prints, on a paper sheet, not only an image read by the scan unit 10i but also an image received from another device by the NIC 10g or the modem 10h.

The finisher 10k subjects a printed material obtained by the print unit 10j to post-processing as necessary. The post-processing is a binding process with staples, a punch hole opening process, a folding process, or the like.

The ROM 10c or the auxiliary storage device 10d stores a program for achieving the respective functions such as the copy function described above. The auxiliary storage device 10d also stores a job scheduled to be executed by the image processing device 1, and a job list indicating executed jobs.

The auxiliary storage device 10*d* may be a hard disk drive, a solid state drive (SSD), or the like.

Figure 3:
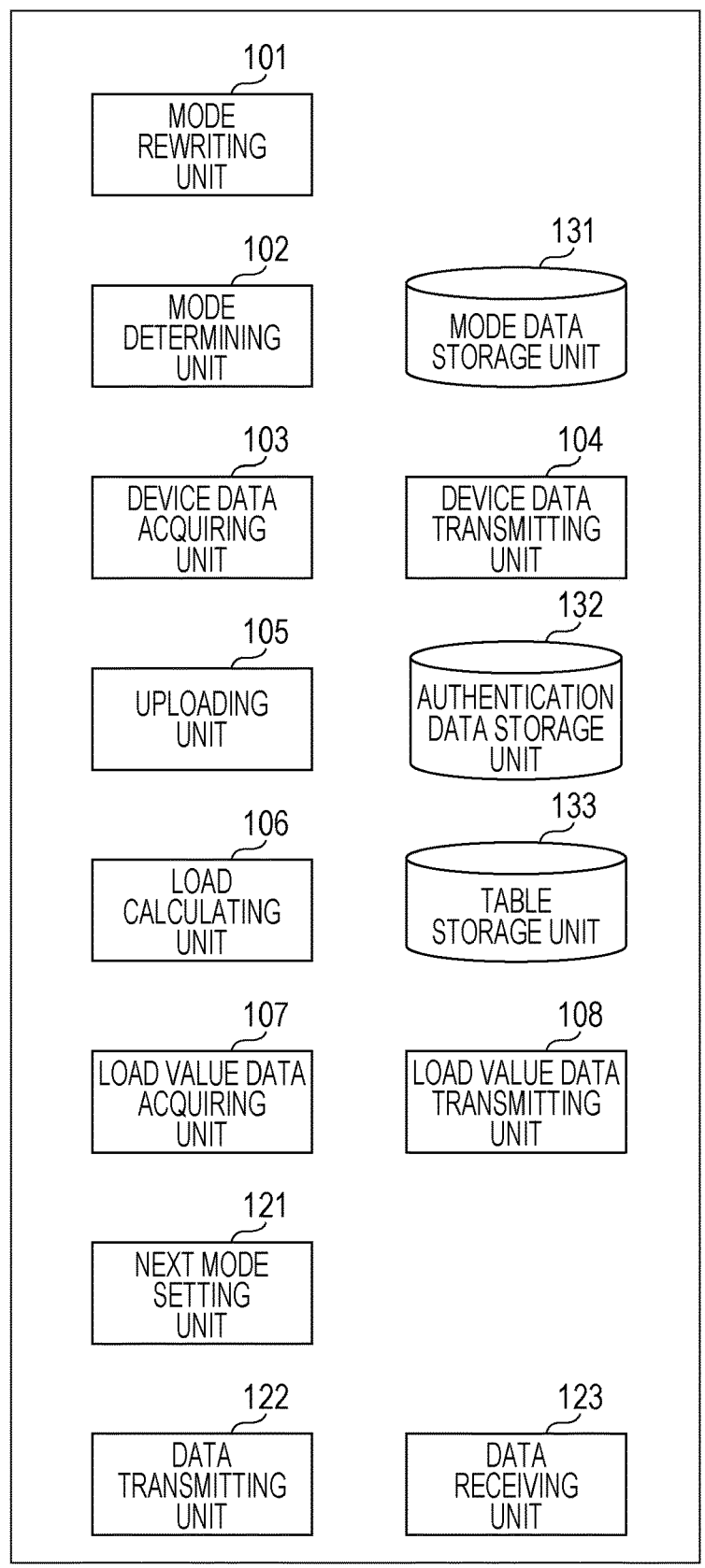
FIG. 3 is a diagram showing an example functional configuration of an image processing device.

The ROM 10*c* or the auxiliary storage device 10*d* also stores a data transmission/reception program 10P (see FIG. 3). The data transmission/reception program 10P is a program for transmitting/receiving the device data 6A (described later) to/from another image processing device 1 or transmitting the device data 6A to the server 2.

These programs are loaded into the RAM 10*b* as necessary, and are executed by the CPU 10*a*.

Referring back to FIG. 1, the server 2 receives the device data 6A of each image processing device 1. The server 2 then analyzes the received device data 6A, and in accordance with the results of the analysis, determines a more preferable installation site for each image processing device 1, the intervals or the timing to replenish expendable supplies, the time for inspection, or the like. The server 2 can also transmit data indicating the details of a determination to an image processing device 1. That is, the server 2 can also function as a device that analyzes big data and feeds back results in a cyber physical system. In the server 2, a program for receiving and analyzing the device data 6A is installed. The server 2 is a cloud server or a so-called server device.

According to the data transmission/reception program 10P, the master MFP can collectively transmit the device data 6A of the respective image processing devices 1 to the server 2 with a shorter delay than that in a conventional case.

The following is a description of this mechanism in an example case where the image processing devices 1 provided in the LAN 50 are three image processing devices 1A, 1B, and 1C, the image processing device 1A is the master MFP and the image processing devices 1B and 1C are slave MFPs in the first period, and each period is one day (which is the period from 0 am to 12 pm on the same day).

Figure 4:
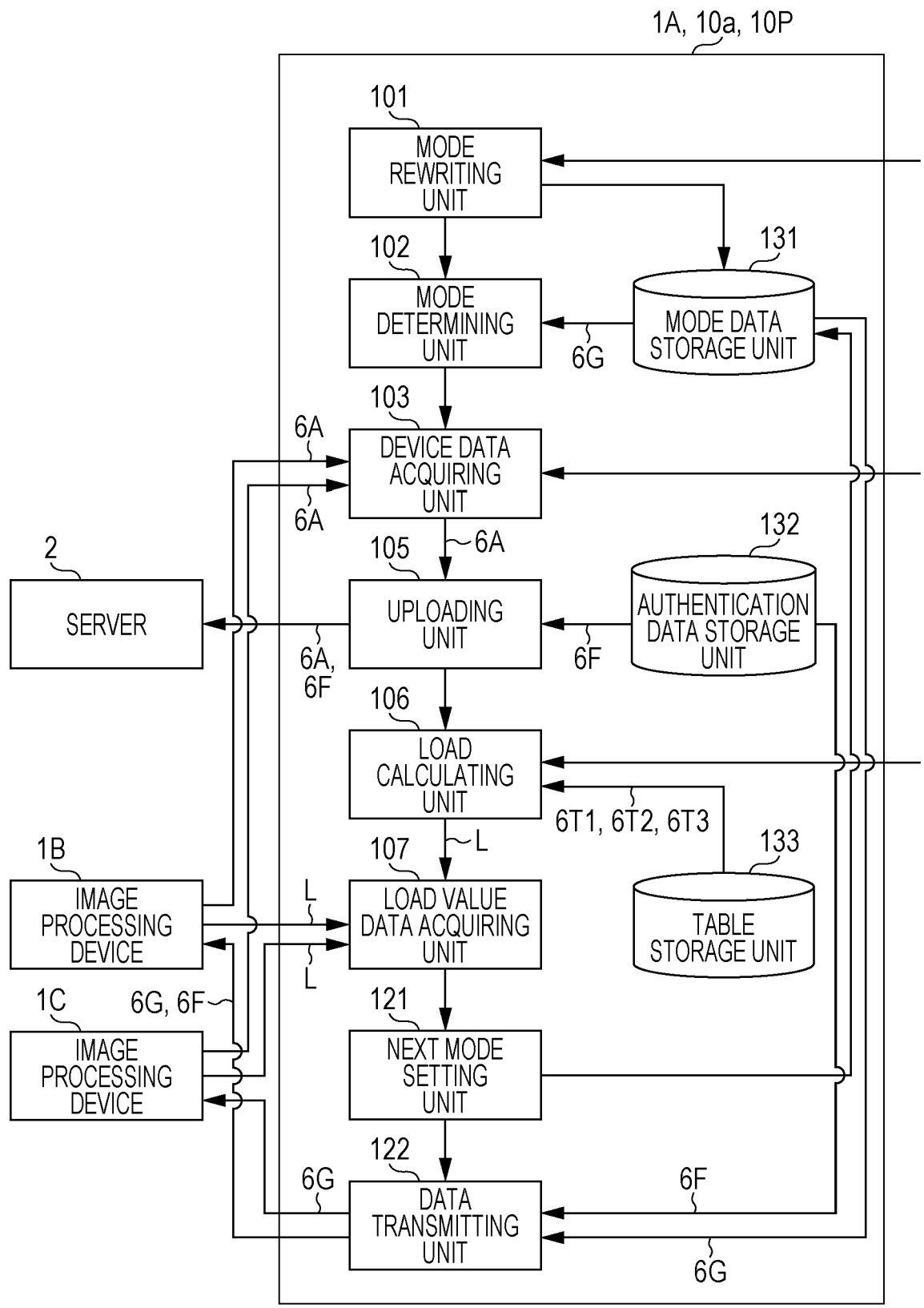
FIG. 4 is a diagram showing an example data flow in a master mode.
Figure 5:
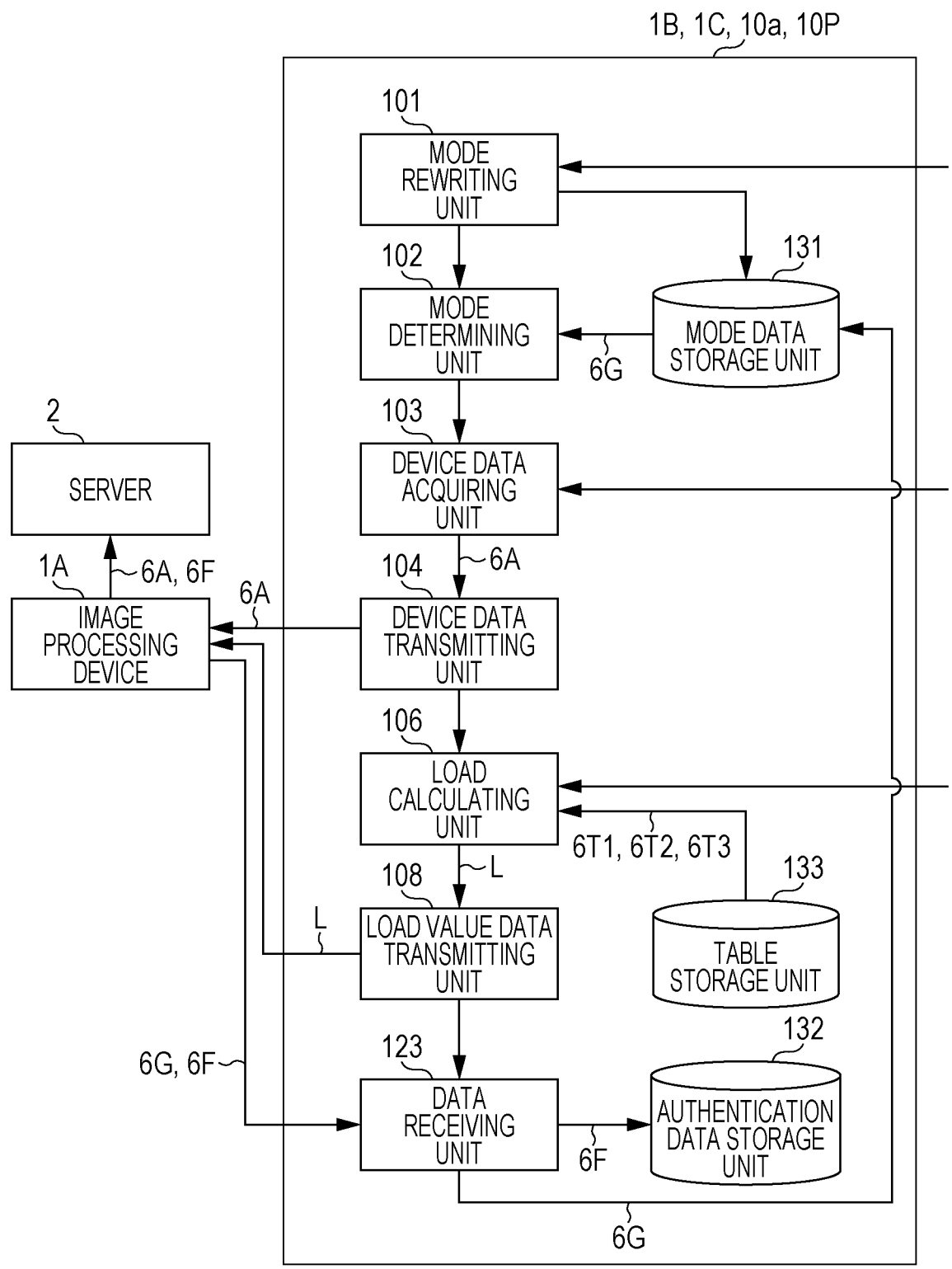
FIG. 5 is a diagram showing an example data flow in a slave mode.
Figure 7:
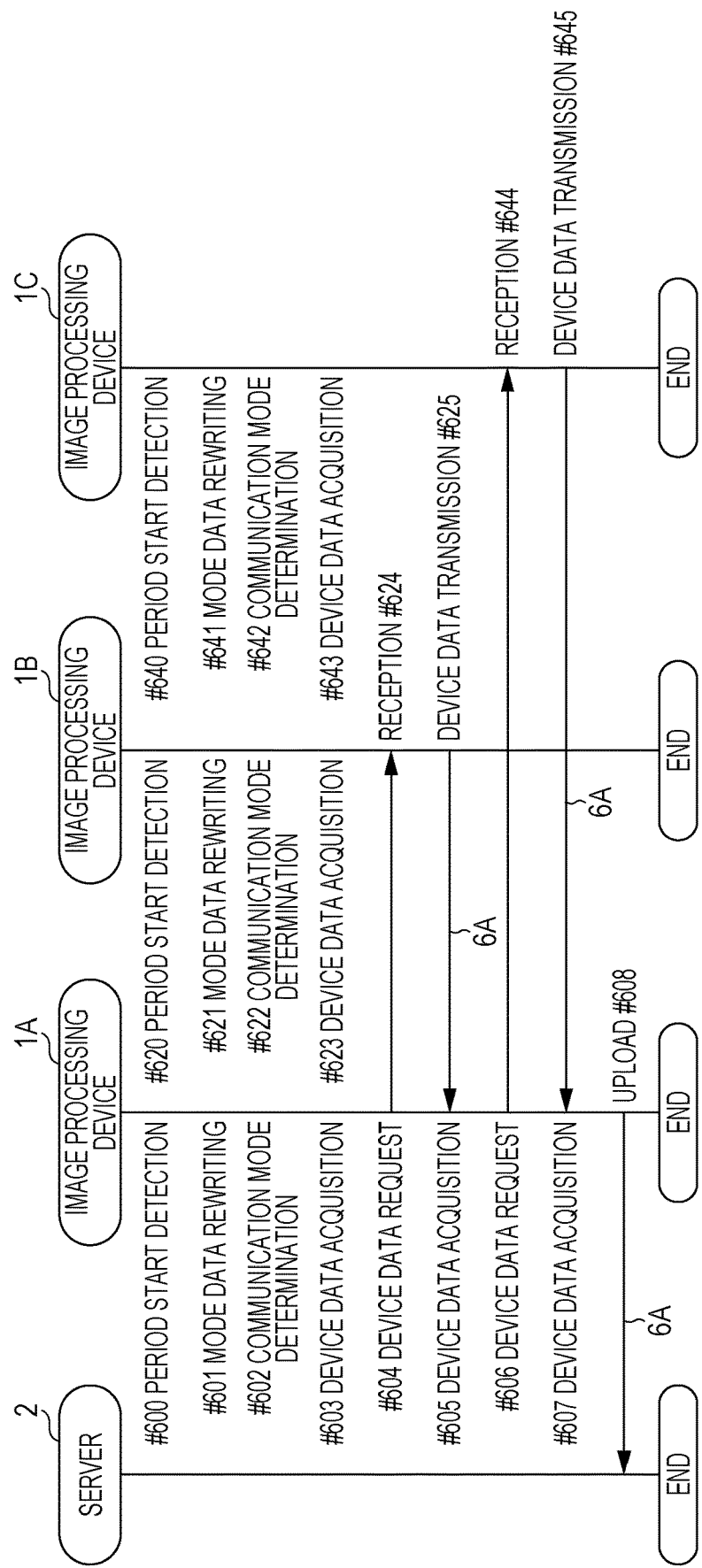
FIG. 7 is a sequence diagram showing respective example process flows in a server and image processing devices.
Figure 8:
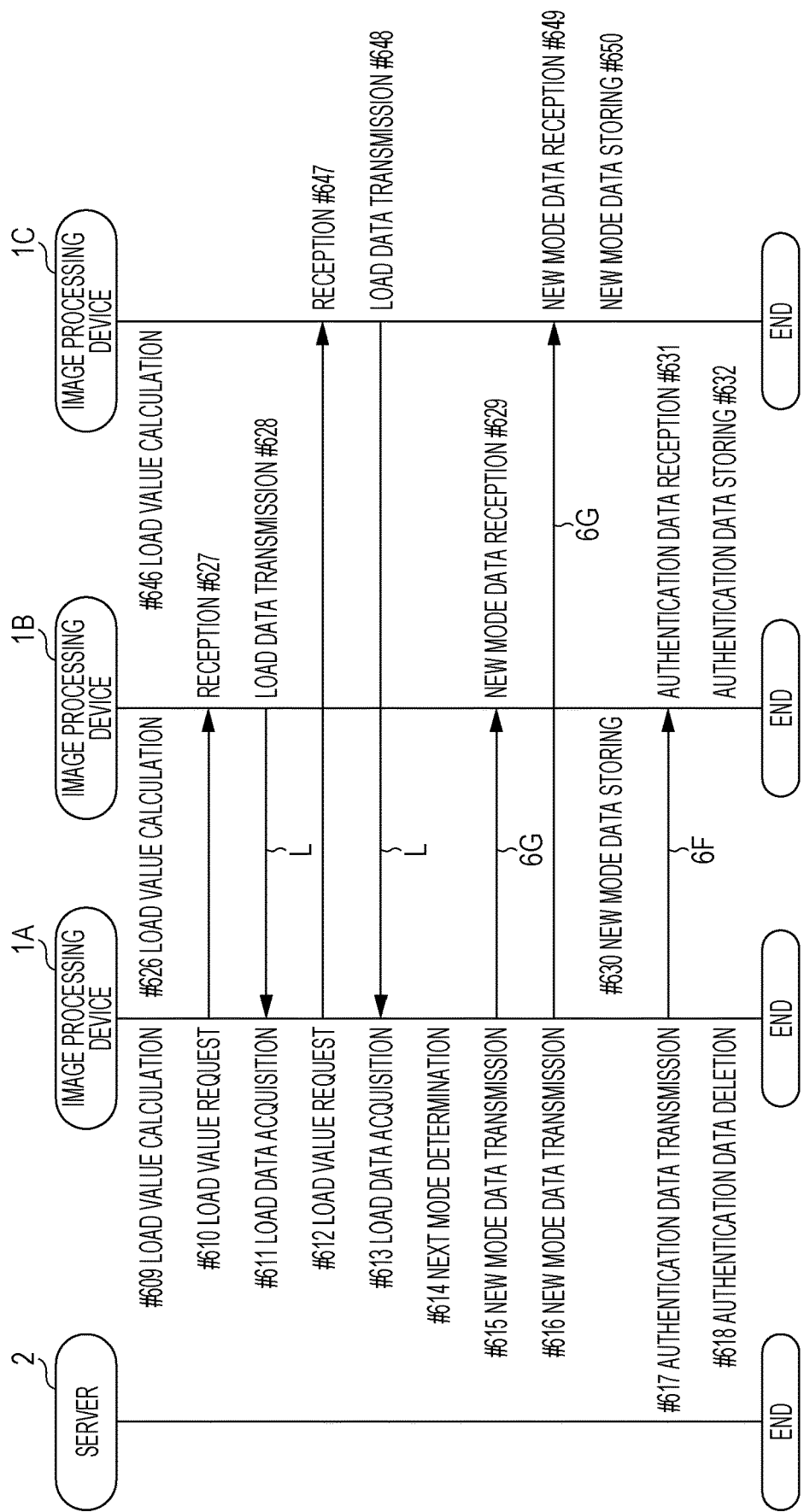
FIG. 8 is a sequence diagram showing respective example process flows in a server and image processing devices.

FIG. 3 is a diagram showing an example functional configuration of an image processing device 1. FIG. 4 is a diagram showing an example data flow in the master mode. FIG. 5 is a diagram showing an example data flow in the slave mode. FIGS. 6A through 6C are tables showing examples of mode data 6G. FIGS. 7 and 8 are sequence diagrams showing respective to example process flows in the server 2 and the image processing devices 1A through 1C. FIGS. 9A through 9C show respective examples of attribute-load relation tables 6T1 through 6T3.

The data transmission/reception program 10P is designed to form a mode rewriting unit 101, a mode determining unit 102, a device data acquiring unit 103, a device data transmitting unit 104, an uploading unit 105, a load calculating unit 106, a load value data acquiring unit 107, a load value data transmitting unit 108, a next mode setting unit 121, a data transmitting unit 122, a data receiving unit 123, a mode data storage unit 131, an authentication data storage unit 132, and a table storage unit 133, which are shown in FIG. 3.

In the description below, the functions of the respective units shown in FIG. 3 will be described with reference to FIGS. 4 through 9C. In the master MFP, which is the image processing device 1A, data exchange is conducted as shown in FIG. 4. Meanwhile, in the slave MFPs, which are the image processing devices 1B and 1C, data exchange is conducted as shown in FIG. 5.

The mode data storage unit 131 of each of the image processing devices 1A through 1C stores mode data 6G indicating the identifier of the corresponding image processing device 1, the current mode, and the next mode, as shown in FIGS. 6A through 6C.

The "current mode" is the communication mode to be set in the current period. The "next mode" is the communication mode scheduled to be set in the next period.

The default value of the current mode of the mode data 6G is blank (NULL), and the value of the next mode is of the communication mode to be set in the first period. The value of the next mode may be determined freely by the user in advance. However, there is only one set of mode data 6G in which the value of the next mode is "master".

For example, the user designates "master" as the next mode of one image processing device 1 of the image processing devices 1A through 1C, by operating the touch panel display 10*e* of the image processing device 1A. In this example, "master" is designated as the next mode of the image processing device 1A.

The mode data storage unit 131 of the image processing device 1A then generates the mode data 6G of each of the image processing devices 1A through 1C, and stores the generated mode data 6G as shown in FIG. 6A. The generated mode data 6G is also transmitted to the other image processing devices 1 (the image processing devices 1B and 1C). The transmitted mode data 6G is then stored into the mode data storage unit 131 of each of the other image processing devices 1.

The authentication data storage unit 132 stores authentication data 6F. The to authentication data 6F is the data indicating information (such as a user code and a password) for logging in to the server 2. However, at the beginning of execution of the data transmission/reception program 10P, the authentication data 6F is stored only in the authentication data storage unit 132 of the master MFP. In this example, the authentication data 6F is stored only in the authentication data storage unit 132 of the image processing device 1A.

[Acquisition of Device Data 6A and Transmission to the Server 2 in the First Period]

The image processing devices 1A through 1C perform processing through the procedures shown in FIGS. 7 and 8.

Upon detecting the start of a new period (#600, #620, and #640), the mode rewriting unit 101 of each of the image processing devices 1A through 1C rewrites the mode data 6G stored in the corresponding mode data storage unit 131 as follows (#601, #621, and #641). The value of the current mode of each set of mode data 6G is rewritten to the value of the next mode. The value of the next mode of each set of mode data 6G is cleared. That is, the value of the next mode is rewritten to blank (NULL).

In this example, each mode rewriting unit 101 detects the start of a new period when the timer built in the image processing device 1 indicates "0 am".

In this example, the mode rewriting unit 101 of each of the image processing devices 1A through 1C also rewrites the mode data 6G as shown in FIG. 6B. Specifically, the value of the current mode of the image processing device 1A is rewritten to "master", and the value of the next mode is rewritten to NULL. The current mode value of each of the image processing devices 1B and 1C is rewritten to "slave", and the value of the next mode is rewritten to NULL.

As the mode data 6G is rewritten (updated) in this manner, the communication modes for the current period are set. In this example, the master mode is set as the communication mode of the image processing device 1A, and the slave mode is set as the communication mode of the image processing device 1B and the communication mode of the image processing device 1C.

In accordance with the mode data 6G stored as its own mode data 6G rewritten by the mode rewriting unit 101, the mode determining unit 102 of each of the image processing devices 1A through 1C determines its own current communication mode (#602, #622, and #642). Specifically, when the value of the current mode of the mode data 6G stored in the mode data storage unit 131 of the image processing device 1A is "master", the mode determining unit 102 of the image processing device 1A determines the communication to be the master mode. When the value of the current mode is "slave", the mode determining unit 102 determines the to communication mode to be the slave mode.

In this example, the mode determining unit 102 of the image processing device 1A determines that the communication mode of the image processing device 1A in the current (first) period is the master mode. The mode determining unit 102 of each of the image processing devices 1B and 1C determines that the communication mode of each of the image processing devices 1B and 1C in the current period is the slave mode.

The device data acquiring unit 103 of each of the master MFP and the slave MFPs acquires its own current device data 6A as follows (#603, #623, and #643), for example.

The device data acquiring unit 103 inquires of its own operating system about the free space in the auxiliary storage device 10d. Alternatively, the device data acquiring unit 103 inquires of its own print unit 10j about the remaining amount of paper, the remaining amount of toner, and the cumulative number of printed sheets. Alternatively, the device data acquiring unit 103 inquires of its own finisher 10k about the remaining number of staples. The device data acquiring unit 103 then generates the device data 6A that is data indicating a response obtained as a result of the inquiry. In this manner, the device data 6A is acquired. In addition to the above, the device data 6A indicates the identifier of its own device.

Further, the device data acquiring unit 103 of the master MFP requests and acquires the current device data 6A of the respective slave MFPs from the slave MFPs. In this example, the device data acquiring unit 103 of the image processing device 1A requests the device data 6A from the image processing devices 1B and 1C (#604 through #607).

In response to the request from the device data acquiring unit 103 of the master MFP, the device data transmitting unit 104 of each slave MFP transmits the device data 6A of its own device to the master MFP. That is, the device data transmitting unit 104 generates and executes a transmission data transmission job. In this example, the device data transmitting unit 104 of each of the image processing devices 1B and 1C transmits the device data 6A of its own device to the image processing device 1A (#624, #625, #644, and #645).

The uploading unit 105 of the master MFP collectively transmits the device data 6A of the master MFP and the device data 6A of the respective slave MFPs to the server 2. The uploading unit 105 generates and executes a transmission data transmission job. It should be noted that the uploading unit 105 reads the authentication data 6F from the authentication data storage unit 132, and logs in to the server 2 in advance using the authentication data 6F. In this example, the uploading unit 105 of the image processing device 1A collectively uploads the device data 6A of its own device acquired in step #603 and the device data 6A of the respective to image processing devices 1B and 1C acquired in steps #605 and #607 to the server 2 (#608).

[Preparation for the Next Period]

In each of the image processing devices 1A through 1C, a process of preparing for transmission of the device data 6A to the server 2 in the next period is performed as follows.

The load calculating unit 106 of each of the image processing devices 1A through 1C performs a process of calculating the current load value L. The "load value L" is a value indicating the level of the load that hinders (delays) generation and prompt execution of a job for transmitting the device data 6A through the device data transmitting unit 104 or the uploading unit 105. Hereinafter, this job will be sometimes referred to as the "device data transmission job".

Where a PC print job (a job of PC printing), a copy job (job of copying), or a transmission job (a job of reading an image with the scan unit 10i and transmitting the image to another device through the NIC 10g) is being executed, or two or more of these jobs are being executed at the same time, sufficient resources (the CPU 10a, the RAM 10b, the auxiliary storage device 10d, the NIC 10g, the communication line 4, and the like) might not be allocated for the device data transmission job. As a result, generation of the device data transmission job is delayed, or completion of execution thereof is delayed.

Also, if there is a job waiting to be executed before the device data transmission job, the start of execution of the device data transmission job might be delayed.

In other words, a job that is being executed or is waiting to be executed might become a hinderance to generation or prompt execution of the device data transmission job.

Therefore, the load calculating unit 106 calculates the load value L as described below, in accordance with the job being executed or waiting to be executed. Hereinafter, a job being executed or waiting to be executed will be referred to as a "preceding job". It should be noted that a preceding job can be identified from the job list stored in the auxiliary storage device 10d.

From the operating system, the job manager, or the like, the load calculating unit 106 acquires the job data 6C of each of the preceding jobs of its own image processing device 1 at a predetermined time during the current period. The job data 6C indicates not only the type of the preceding job but also the attribute corresponding to the type.

For example, the job data 6C of a PC print job indicates a print page number, a resolution, a data size, and an image type.

The "print page number" is the number of pages to be printed. The "resolution" is the resolution of the image to be printed. The "data size" is the size of the data of the image to be printed, the data being transmitted from a terminal device 51 as the request source. The "image to type" is the type of the image to be printed.

The job data 6C of a transmission job indicates a transmission page number, a resolution, a file format, and optical character reader (OCR) compatibility. The "transmission page number" is the number of pages to be transmitted. The "resolution" is the resolution of image reading by the scan unit 10i. The "file format" is the file format of the image to be transmitted. That is, the "file format" indicates into which format the read image has been converted. The "OCR compatibility" indicates whether to generate text data by performing OCR processing on the characters included in the image to be transmitted.

The job data 6C of a copy job indicates a document number, image synthesis suitability, booklet suitability, and color conversion suitability.

The "document number" is the number of documents to be copied. The "image synthesis suitability" indicates whether to combine another image (a watermark, a security mark, or the like) with an image read by the scan unit 10i. The "booklet suitability" indicates whether to copy the document in such a manner as to form a booklet. The "color conversion suitability" indicates whether to convert the colors of the image read by the scan unit 10i (for example, whether to convert a multicolor image into a monochrome image).

The predetermined time is the time at which the device data acquiring unit 103 starts acquiring the device data 6A, for example. Alternatively, the predetermined time is the time when the current period starts (0 am in this example). The predetermined time may also be a predetermined time (one hour, for example) after the start of the current period. The predetermined time may also be a predetermined time (10 minutes, for example) before the end of the current period.

Meanwhile, the table storage unit 133 stores attribute-load relation tables 6T1 through 6T3.

As shown in FIG. 9A, the attribute-load relation table 6T1 shows load values Ra through Rd. Specifically, the load values Ra through Rd are shown as follows.

For each print page number Fa, the load value to be applied to other jobs in a case where the print page number in the print job is the print page number Fa is shown as the load value Ra. In this example, load values Ra1, Ra2, Ra3, and Ra4 are shown as the load values Ra for "1 to 10 pages", "11 to 30 pages", "31 to 50 pages", and "51 pages or more", respectively.

Here, Ra1<Ra2<Ra3<Ra4. For example, Ra1=1, Ra2=2, Ra3=3, and Ra4=4. The larger the print page number Fa, the greater the load value Ra.

For each resolution Fb, the load value to be applied to other jobs in a case where the resolution of the print job is the resolution Fb is indicated as the load value Rb. In this example, load values Rb1, Rb2, and Rb3 are shown as the load values Rb for "300 dpi", "600 dpi", and "1200 dpi", respectively.

Here, Rb1<Rb2<Rb3. For example, Rb1=1, Rb2=2, and Rb3=3. The higher the resolution Fb, the greater the load value Rb.

For each data size Fc, the load value to be applied to other jobs in a case where the data size in the print job is the data size Fc is indicated as the load value Rc. In this example, load values Rc1, Rc2, and Rc3 are shown as the load values Rc for "less than 1M byte", "1M byte or more and less than 10M bytes", and "10M bytes or more", respectively.

Here, Rc1<Rc2<Rc3. For example, Rc1=1, Rc2=2, and Rc3=3. The larger the data size Fc, the greater the load value Rc.

For each image type Fd, the load value to be applied to other jobs in a case where the type of the image to be printed in the print job is the image type Fd is indicated as the load value Rd. In this example, load values Rd1, Rd2, and Rd3 are shown as the load values Rd for a "characters only" image formed only with characters, a "figure(s) included" image including one or more figures, and a "picture(s) included" image including one or more pictures, respectively.

Here, Rd1<Rd2<Rd3. For example, Rd1=1, Rd2=2, and Rd3=3.

As shown in FIG. 9B, the attribute-load relation table 6T2 shows load values Sa through Sd. Specifically, the load values Sa through Sd are shown as follows.

For each transmission page number Ga, the load value to be applied to other jobs in a case where the transmission page number in the transmission job is the transmission page number Ga is shown as the load value Sa. In this example, load values Sa1, Sa2, Sa3, and Sa4 are shown as the load values Sa for "1 to 10 pages", "11 to 30 pages", "31 to 50 pages", and "51 pages or more", respectively.

Here, Sa1<Sa2<Sa3<Sa4. For example, Sa1=1, Sa2=2, Sa3=3, and Sa4=4. The larger the transmission page number Ga, the greater the load value Sa.

For each resolution Gb, the load value to be applied to other jobs in a case where the resolution (the read resolution) of the transmission job is the resolution Gb is indicated as the load value Sb. In this example, load values Sb1, Sb2, and Sb3 are shown as the load values Sb for "200 dpi", "300 dpi", and "600 dpi", respectively.

Here, Sb1<Sb2<Sb3. For example, Sb1=1, Sb2=2, and Sb3=3. The higher the resolution Gb, the greater the load value Sb.

For each file format Gc, the load value to be applied to other jobs in a case where the file format of the file to be used in the transmission job is the file format Gc is indicated as the load value Sc. In this example, load values Sc1, Sc2, and Sc3 are shown as the load values Sc for "compact Portable Document Format (PDF)", "Joint Photographic Experts Group (JPEG)", and "PDF", respectively.

Here, Sc1<Sc2<Sc3. For example, Sc1=1, Sc2=2, and Sc3=3.

For each OCR compatibility Gd, the load value to be applied to other jobs in each of cases where OCR processing is to be performed in the transmission job and where OCR processing is not to be performed in the transmission job is shown as the load value Sd. In this example, load values Sd1 and Sd2 are shown as the load values Sd for a case where there is OCR compatibility and a case where there is no OCR compatibility, respectively. Here, Sd1<Sd2. For example, Sd1=1, and Sd2=2.

As shown in FIG. 9C, the attribute-load relation table 6T3 shows load values Ua through Ud. Specifically, the load values Ua through Ud are shown as follows.

For each document number Ha, the load value to be applied to other jobs in a case where the document number in the copy job is the document number Ha is shown as the load value Ua. In this example, load values Ua1, Ua2, Ua3, and Ua4 are shown as the load values Ua for "1 to 10 sheets", "11 to 30 sheets", "31 to 50 sheets", and "51 or more sheets", respectively.

Here, Ua1<Ua2<Ua3<Ua4. For example, Ua1=1, Ua2=2, Ua3=3, and Ua4=4. The larger the document number Ha, the greater the load value Ua.

For each image synthesis suitability Hb, the load value to be applied to other jobs in each of cases where image synthesis is to be performed in the copy job and where image synthesis is not to be performed in the copy job is shown as the load value Ub. In this example, load values Ub1 and Ub2 are shown as the load values Ub for a case where image synthesis is to be performed and a case where image synthesis is not to be performed, respectively. Here, Ub1<Ub2. For example, Ub1=1, and Ub2=2.

For each booklet suitability Hc, the load value to be applied to other jobs in each of cases where copying is to be performed to form a booklet in the copy job and copying is to be performed not to form a booklet in the copy job is shown as the load value Uc. In this example, load values Uc1 and Uc2 are shown as the load values Uc for a case where there is booklet suitable and a case where there is no booklet suitability, respectively. Here, Uc1<Uc2. For example, Uc1=1, and Uc2=2.

For each color conversion suitability Hd, the load value to be applied to other jobs in to each of cases where color conversion is to be performed in the copy job and where color conversion is not to be performed in the copy job is shown as the load value Ud. In this example, load values Ud1 and Ud2 are shown as the load values Ud for a case where there is color conversion suitability and a case where there is no color conversion suitability, respectively. Here, Ud1<Ud2. For example, Ud1=1, and Ud2=2.

Referring back to FIGS. 4 and 5, the load calculating unit 106 calculates the load value V of a preceding job as follows. The load values corresponding to the respective values indicated in the job data 6C of the preceding job are extracted from the table corresponding to the type of the preceding job among the attribute-load relation tables 6T1 through 6T3.

The respective extracted values are then substituted into the expression corresponding to the type of the preceding job among the following expressions (1) through (3).

<In the case of a print job>

$$V=Ra+Rb+Rc+Rd \quad (1)$$

<In the case of a transmission job>

$$V=Sa+Sb+Sc+Sd \quad (2)$$

<In the case of a copy job>

$$V=Ua+Ub+Uc+Ud \quad (3)$$

For example, in a case where the job is a print job, and the job data 6C thereof shows "8 sheets", "1200 dpi", "7 MB", and "characters only" as the print page number, the resolution, the data size, and the image type, respectively, the load values Ra1, Rb3, Rc2, and Rd1 are extracted as the load values Ra, Rb, Rc, and Rd, respectively. The load value V is then calculated by substituting the load values Ra1, Rb3, Rc2, and Rd1 into the expression (1). Thus, "Ra1+Rb3+Rc2+Rd1" is calculated as the load value V.

In a case where there are two or more preceding jobs, the load calculating unit 106 calculates the load value V of each of the preceding jobs by the above described method.

The load calculating unit 106 then calculates the sum of the load values V of the respective preceding jobs as the load value L.

In this embodiment, the load values Ra through Rd, the load values Sa through Sc, and the load value Ua are determined in accordance with the attribute-load relation tables 6T1, 6T2, and 6T3, respectively. However, these values may be determined from functions. Each of these tables and functions should be prepared by executing the respective kinds of jobs under varying conditions and measuring the times required for completion of the respective jobs, for example.

For each image processing device 1, the load values Ra through Rd, the load values Sa to through Sd, and the load values Ua through Ud may be adjusted in accordance with the characteristics of the image processing device 1.

The load value data acquiring unit 107 of the master MFP, which is the image processing device 1A, requests and acquires the load values L of the respective slave MFPs from the respective slave MFPs (#610 through #613).

The load value data transmitting unit 108 of each of the slave MFPs, which are the image processing devices 1B and 1C, transmits data indicating the load value L calculated by the load calculating unit 106 of its own device, in response to a request from the load value data acquiring unit 107 of the master MFP (#627 and #628, and #647 and #648). Hereinafter, the load values L calculated by the load calculating units 106 of the image processing devices 1A, 1B, and 1C will be sometimes referred to as the "load value L1", the "load value L2", and the "load value L3", respectively.

The next mode setting unit 121 of the master MFP performs a process of setting the communication mode in the period next to the current period, or a process of determining the value of the next mode of the mode data 6G, in the following manner (#614).

The next mode setting unit 121 of the master MFP determines the smallest load value L among the respective load values L of the master MFP and the slave MFPs (or among the load values L1 through L3). The next mode setting unit 121 identifies the image processing device 1 corresponding to the smallest load value L. The next mode setting unit 121 then updates the value of the next mode of the mode data 6G of the identified image processing device 1 to "master", and updates the value of the next mode of the mode data 6G of each of the other image processing devices 1 to "slave".

For example, in a case where the next mode setting unit 121 of the master MFP determines that the load value L2 is the smallest, the next mode setting unit 121 identifies the image processing device 1B as the image processing device 1 corresponding to the load value L2. The next mode setting unit 121 then updates the next mode of the mode data 6G of the image processing device 1B to "master", and updates the next mode of the mode data 6G of each of the image processing devices 1A and 1C to "slave", as shown in FIG. 6C.

After the value of the next mode of the mode data 6G of each image processing device 1 is updated, the data transmitting unit 122 of the master MFP reads the updated mode data 6G from the mode data storage unit 131, and transmits the mode data 6G to each slave MFP (#615 and #616).

The data transmitting unit 122 of the master MFP also reads the authentication data 6F from the authentication data storage unit 132, and transmits the authentication data 6F to the image processing device 1 in which "master" is set as the next mode in the mode data 6G (#617). The authentication data 6F is then deleted from the authentication data storage unit 132 (#618). However, in a case where this image processing device 1 is the master MFP, neither transmission nor deletion of the authentication data 6F is performed.

Upon receiving the mode data 6G from the master MFP (#629 and #649), the data receiving units 123 of the slave MFPs store the mode data 6G into their own mode data storage units 131 (#630 and #650). In a case where the authentication data 6F is further received (#631), the authentication data 6F is stored into the authentication data storage unit 132 (#632).

[Acquisition of Device Data 6A and Transmission to the Server 2 in the Second and Subsequent Periods]

In the second and subsequent periods, the image processing devices 1A through 1C perform the same process as the above described steps #601 through #618, the same process as the above described steps #621 through #632, and the same process as the above described steps #641 through #650, every time a new period starts.

However, the image processing device 1 in which "master" is set as the next mode in the mode data 6G in the previous period performs a process as the master MFP, or the same process as steps #601 through #618. Further, each image processing device 1 in which "slave" is set as the next mode in the mode data 6G in the previous period performs a process as a slave MFP, or the same process as steps #621 through #632 or steps #641 through #650.

Figure 10:
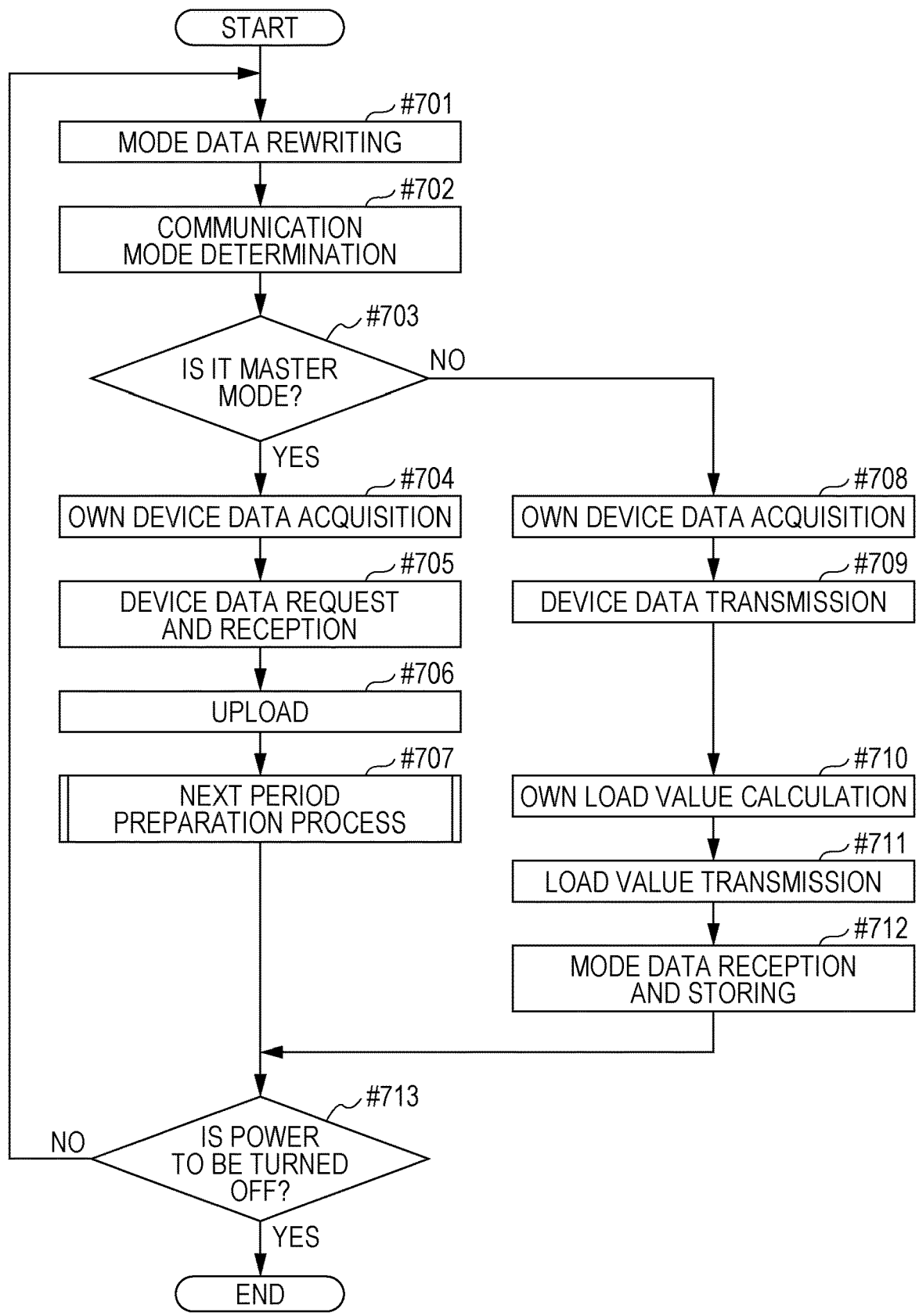
FIG. 10 is a flowchart for explaining an example flow in an overall process to be performed by an image processing device.
Figure 11:
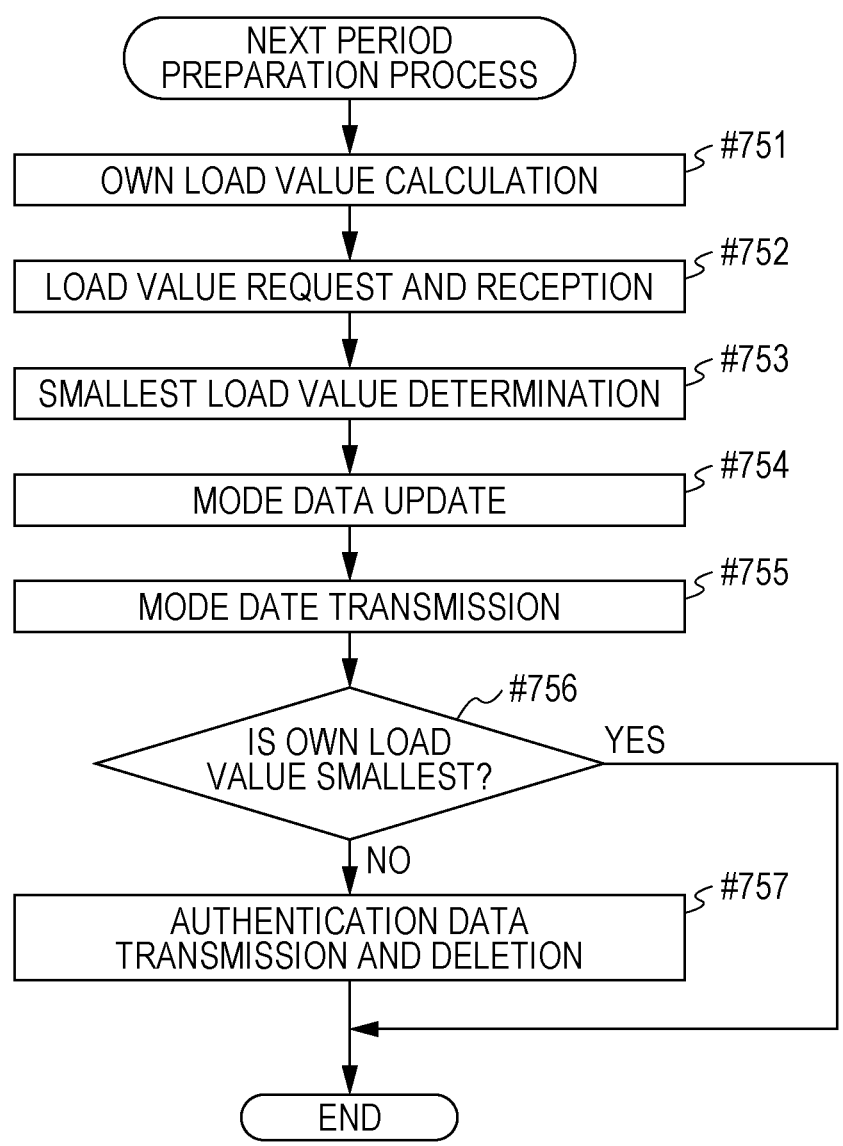
FIG. 11 is a flowchart for explaining an example flow in a next period preparation process.

FIG. 10 is a flowchart for explaining an example flow in an overall process to be performed by an image processing device 1. FIG. 11 is a flowchart for explaining an example flow in a next period preparation process.

Next, the flow in a process to be performed by an image processing device 1 is described, with reference to the flowcharts. The image processing device 1 performs the process through the procedures shown in FIG. 10, in accordance with the data transmission/reception program 10P.

Upon detecting the start of a new period, the image processing device 1 updates the stored mode data 6G (#701 in FIG. 10). Specifically, the image processing device 1 changes the value of the current mode to the value of the next mode, and clears the value of the next mode. In accordance with the updated mode data 6G, the image processing device 1 determines its own communication mode in the current period (#702).

In a case where the communication mode is the master mode (Yes in #703), the image processing device 1 acquires its own device data 6A (#704), and requests and receives the device to data 6A from each slave MFP (#705). The image processing device 1 then logs in to the server 2 by using the authentication data 6F, and uploads, to the server 2, its own device data 6A and the device data 6A received from each slave MFP (#706).

In parallel with or before or after steps #704 through #706, the image processing device 1 carries out the procedures shown in FIG. 11, to perform the next period preparation process (#707) for preparing for transmission of the device data 6A in the next period.

The image processing device 1 calculates the load value L of the image processing device 1 (#751 in FIG. 11). The image processing device 1 requests and receives the load values L from the respective slave MFPs (#752). The image processing device 1 determines the smallest load value L among its own load value L and the load values L of the respective slave MFPs (#753). The image processing device 1 updates the stored mode data 6G (#754). Specifically, using the result of the determination, the image processing device 1 determines the value of the next mode. The image processing device 1 transmits the updated mode data 6G to each slave MFP (#755). In a case where the image processing device 1 does not have the smallest load value L (No in #756), the image processing device 1 transmits the authentication data 6F to each slave MFP having the smallest load value L, and deletes the stored authentication data 6F (#757).

In a case where the communication mode is the slave mode (No in #703), the image processing device 1 acquires the device data 6A of the image processing device 1 (#708). In accordance with a request from the master MFP, the image processing device 1 transmits its own device data 6A (#709).

The image processing device 1 calculates the load value L of the image processing device 1 (#710), and transmits its own load value L in response to a request from the master MFP (#711). Upon receiving the mode data 6G and the authentication data 6F from the master MFP, the image processing device 1 stores these sets of data (#712). The process in steps #710 through #712 is performed in parallel with or before or after the above described process in steps #708 and #709.

The image processing device 1 continues these processes until the power supply to the image processing device 1 is turned off (No in #713).

According to this embodiment, it is possible to complete the process of collectively transmitting the device data 6A of the image processing devices 1A through 1C with a shorter delay than that in a conventional case.

In this embodiment, each image processing device 1 acquires the device data 6A as data to be uploaded to the server 2, but may acquire some other data. For example, each image processing device 1 may acquire data (failure data) indicating the failure(s) that has (have) occurred therein. Alternatively, to collect a usage fee from each user (or to charge each user), each image processing device 1 may acquire data (charging data) indicating the job(s) executed by itself and the user(s) who instructed the image processing device 1 to execute the job(s).

In this embodiment, the master MFP acquires the device data 6A every day and uploads the device data 6A to the server 2. However, the master MFP may transmit the device data 6A at some other frequency. The frequency may be determined as appropriate in accordance with the contents of the device data 6A and the environment of the image processing device 1. Likewise, in a case where data other than the device data 6A is transmitted, the frequency of acquisition and upload should be determined as appropriate in accordance with the contents of the data. For example, failure data may be acquired and uploaded every minute. Charging data may be acquired and uploaded the day before the settlement date in each month.

In this embodiment, the data transmitting unit 122 deletes the authentication data 6F when transmitting the authentication data 6F to another image processing device 1 having the smallest load value L. However, the authentication data 6F may be stored in the authentication data storage unit 132 as it is. In such a case, the authentication data 6F is not to be transmitted to the image processing device(s) 1 to which the authentication data 6F has been transmitted once.

In this embodiment, each image processing device calculates its own load value. However, the master MFP may calculate load values. In this case, a slave MFP transmits its own job data 6C to the master MFP, instead of calculating its own load value L. The master MFP then calculates the load value L of the slave MFP in accordance with the job data 6C received from the slave MFP.

Figure 12:
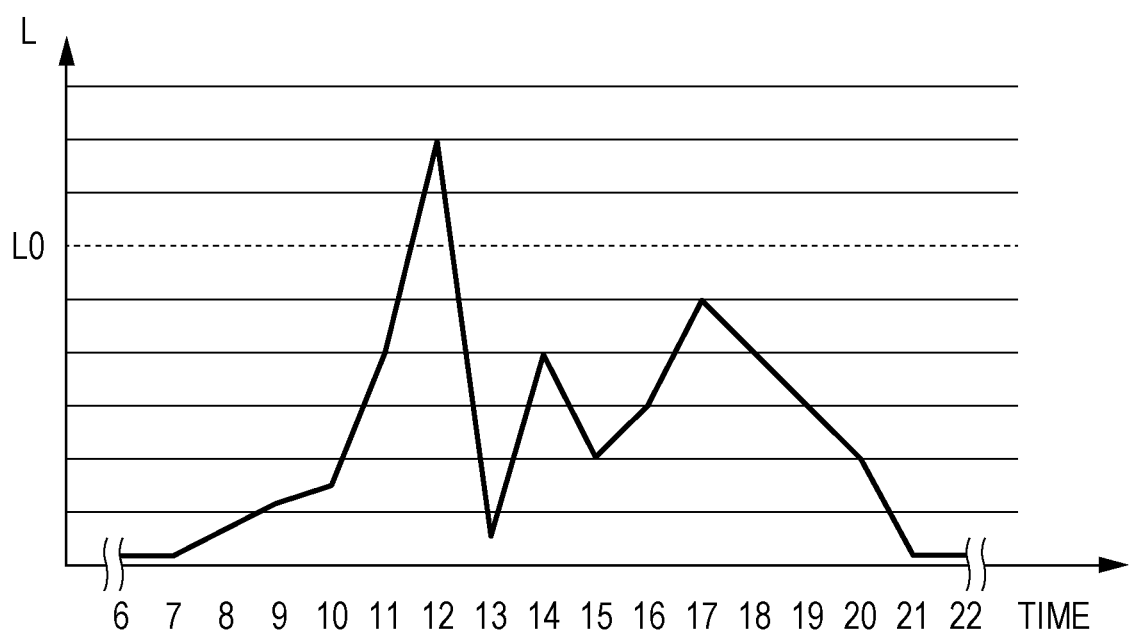
FIG. 12 is a graph showing an example of transition of a load value.

FIG. 12 is a graph showing an example of transition of a load value L. In this embodiment, a slave MFP transmits the device data 6A and the load value L in response to a request from the master MFP. However, a slave MFP may voluntarily transmit the device data 6A or the load value L immediately after acquiring the device data 6A or calculating the load value L. Particularly, in a case where the load value L exceeds a predetermined value, it is desirable to immediately transmit the load value L voluntarily. If a request from the master MFP is waited for in such a case, completion of transmission is delayed, and the master MFP might not be able to determine the next modes of the respective image processing devices 1 before the required time.

Further, a load value L varies in a fairly regular manner in some cases. For example, in a case where the length of each period is one hour, and a certain image processing device 1 is used at a company or a government office, the load value L varies every day with the operations of the employees with a tendency similar to that shown in FIG. 12. In other words, it is possible to predict a period (a time slot) during which the load value L becomes high.

Therefore, in a case where the current period is a period (the period from 11:00 to 12:00 or the period from 12:00 to 13:00 in the example shown in FIG. 12) during which the load value L is predicted to exceed a predetermined value L0, a slave MFP may voluntarily transmit the device data 6A or the load value L immediately after the acquisition or the calculation.

In this embodiment, during the current period, the master MFP determines the communication mode of the next period (the period immediately after the current period) of each image processing devices 1. However, the communication mode of a much later period having the same attribute as the current period may be determined.

For example, in a case where the length of each period is one day, the master MFP may determine the communication mode of the period that is a week later. That is, if the current period is Monday, the communication mode of next Monday may be determined. In such a case, however, the default master MFP must be set in advance for each day of the week (each of the seven days of the week).

Likewise, in a case where the length of each period is one hour, the master MFP may determine the communication mode of the same time slot tomorrow. That is, if the current period is the time slot of 10:00 to 11:00 am, the communication mode of the time slot of 10:00 to 11:00 am tomorrow may be determined. In such a case, however, the default master MFP must be set in advance for each time slot (each of the 24 time slots).

In this embodiment, the device data 6A of the image processing devices 1 provided in the LAN 50, which is a local area network, is collectively uploaded to the server 2. However, the present invention can also be applied in a case where the device data 6A of image processing devices 1 provided in a network of some other form is collectively uploaded to the server 2. For example, the present invention can be applied in a case where the device data 6A of image processing devices 1 provided in a virtual private network (VPN) is collectively uploaded to the server 2.

In this embodiment, the data of the image processing devices 1 is collectively uploaded as the device data 6A to the server 2. However, the data of devices such as personal computers, tablet computers, or network attached storages (NASs) may be collectively uploaded. In this case, the functions shown in FIG. 3 should be provided in these devices. In this embodiment, each image processing device 1 calculates the load value L in accordance with the contents of the job being executed or on standby for execution. However, the load value L may be calculated in accordance with the contents of an already executed job. The load value L may be regarded as being the magnitude of the load in a specific period in the future. For example, at 11:00 on a day, the load value L is calculated in accordance with the contents of the job executed during the time slot from 9:00 to 10:00 on the day. This load value L is used for determining the communication mode of the next day. Alternatively, at a specific time in this time slot, a job for transmitting test data to the server 2 is generated, and the time at which the job is completed is calculated. The length from the specific time to the time of the completion of the job may be used as the load value L.

Further, the configurations of the entire data aggregation system 100, the entire LAN 50, the image processing devices 1, the configurations of the respective components of the data aggregation system 100, the LAN 50, and the image processing devices 1, the contents of the processes, the sequence of the processes, the data structures, and the like may be changed as appropriate within the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An information processing device that is provided together with a plurality of other information processing devices in a network and is capable of communicating with a server, the information processing device comprising:
   at least one processor; and
   at least one memory having instructions stored thereon, that when executed by the processor, cause the information processing device to:
   transmit a predetermined kind of information about the respective other information processing devices to the server when the information processing device is in a first mode, and transmits the predetermined kind of information about the information processing device to a device functioning in the first mode among the other information processing devices when the information processing device is in a second mode;
   acquire load information about a load of each of the other information processing devices;
   determine a smallest load device that is the device having the smallest load among the other information processing devices and the information processing device, in accordance with the acquired load information and the load information about the information processing device;
   perform a mode setting process to realize a state where the device determined to be the smallest load device is in the first mode, and the other devices are in the second mode, among the other information processing devices and the information processing device; and
   notify the other information processing devices of the state,
   wherein, when the information processing device is in the second mode in a first period, and the information processing device is put into the first mode in a second period later than the first period, the a data communicator transmits the predetermined kind of information about the information processing device and the predetermined kind of information about each of the other information processing devices to the server in the second period.

2. The information processing device according to claim 1, wherein the first mode is a master mode, and the second mode is a slave mode.

3. The information processing device according to claim 1, wherein the server is provided outside the network.

4. The information processing device according to claim 1, which has a function to execute a job.

5. The information processing device according to claim 4, wherein the job is a job of performing image formation.

6. The information processing device according to claim 4, wherein the job is one of a job of reading and printing a document, a job of reading a document and transmitting the read document as image data to another device, and a job of receiving image data from another device and printing an image.

7. The information processing device according to claim 1, wherein the predetermined kind of information includes at least one piece of hardware-related information and expendable-related information.

8. The information processing device according to claim 1, wherein the load information is calculated in accordance with contents of a job being executed or scheduled to be executed.

9. The information processing device according to claim 1, wherein,
   when the information processing device is in the first mode in a first period, and the information processing device remains in the first mode in a second period later than the first period, a data communicator transmits the predetermined kind of information about each of the other information processing devices to the server in the second period, and, when the information processing device is in the first mode in the first period, and the information processing device is put into the second mode in the second period, the data communicator transmits the predetermined kind of information about the information processing device to a device newly put into the first mode among the other information processing devices in the second period.

10. The information processing device according to claim 9, wherein, when the information processing device is in the first mode in the first period, and the information processing device is put into the second mode in the second period, a mode notifier sends data for identifying a device to be newly put into the first mode among the other information processing devices to devices other than the device newly put into the first mode before the second period.

11. The information processing device according to claim 9, wherein the second period is a period that follows the first period.

12. The information processing device according to claim 10, further comprising
a storage that stores authentication information for logging in to the server,
wherein,
when the information processing device is in the first mode in the first period, and the information processing device is put into the second mode in the second period, the mode notifier transmits the authentication information to a device newly put into the first mode among the other information processing devices before the second period, and
a data communicator transmits the predetermined kind of information to the server after logging in to the server using the authentication information.

13. The information processing device according to claim 12, further comprising instructions to cause the information processing device to
delete the authentication information stored in the storage, after the authentication information is transmitted.

14. The information processing device according to claim 1, wherein the load information is calculated in accordance with a history of executed print jobs.

15. The information processing device according to claim 9, wherein,
when the information processing device is in the first mode in the first period, an acquisitor acquires the load information about each of the other information processing devices in the first period, and
the information processing device further comprises instructions to
determine before the second period into which one of the first mode and the second mode the information processing device is to be put in the second period, in accordance with the load information received from each of the other information processing devices and the load information about the information processing device.

16. The information processing device according to claim 15, wherein, when the information processing device is put into the second mode in the second period, the data communicator transmits the load information about the information processing device to a device newly put into the first mode among the other information processing devices.

17. The information processing device according to claim 16, wherein
the acquisitor acquires the load information about each of the other information processing devices by issuing a request at a predetermined timing,
when the load indicated by the load information about the information processing device exceeds a predetermined magnitude, the data communicator transmits the load information about the information processing device to the device newly put into the first mode without waiting for a request from the device newly put into the first mode among the other information processing devices, and,
when the load indicated by the load information about the information processing device does not exceed the predetermined magnitude, the data communicator transmits the load information about the information processing device after the request is issued.

18. A non-transitory recording medium storing a computer readable program causing a computer to perform processing on the information processing device according to claim 1.

19. A mode setting method implemented in an information processing device that is provided together with a plurality of other information processing devices in a network and is capable of communicating with a server, the method comprising:
transmitting a predetermined kind of information about the respective other information processing devices to the server when the information processing device is in a first mode, and transmitting the predetermined kind of information about the information processing device to a device functioning in the first mode among the other information processing devices when the information processing device is in a second mode;
acquiring load information about a load of each of the other information processing devices;
determining a smallest load device that is the device having the smallest load among the other information processing devices and the information processing device, in accordance with the acquired load information and the load information about the information processing device;
performing a mode setting process to realize a state where the device determined to be the smallest load device is in the first mode, and the other devices are in the second mode, among the other information processing devices and the information processing device; and
notifying the other information processing devices of the state,
wherein, when the information processing device is in the second mode in a first period, and the information processing device is put into the first mode in a second period later than the first period, the a data communicator transmits the predetermined kind of information about the information processing device and the predetermined kind of information about each of the other information processing devices to the server in the second period.

* * * * *